(12) United States Patent
Birkenstock

(10) Patent No.: US 9,764,823 B2
(45) Date of Patent: Sep. 19, 2017

(54) APPARATUS, SYSTEM AND METHOD FOR DRAG REDUCTION

(76) Inventor: David Birkenstock, Herndon, VA (US)

(\*) Notice: Subject to any disclaimer, the term of this patent is extended or adjusted under 35 U.S.C. 154(b) by 1040 days.

(21) Appl. No.: 12/568,779

(22) Filed: Sep. 29, 2009

(65) Prior Publication Data
US 2010/0078522 A1 Apr. 1, 2010

Related U.S. Application Data

(62) Division of application No. 11/314,525, filed on Dec. 22, 2005, now Pat. No. 7,614,588.

(60) Provisional application No. 60/638,351, filed on Dec. 23, 2004, provisional application No. 60/686,932, filed on Jun. 3, 2005.

(51) Int. Cl.
*B64C 21/06* (2006.01)
*B64C 21/10* (2006.01)
*B64C 23/00* (2006.01)

(52) U.S. Cl.
CPC .............. *B64C 21/06* (2013.01); *B64C 21/10* (2013.01); *B64C 23/005* (2013.01); *B64C 2230/04* (2013.01); *B64C 2230/20* (2013.01); *Y02T 50/166* (2013.01)

(58) Field of Classification Search
CPC .................................................... B64C 21/06
USPC ...... 244/198, 200, 130, 123.14, 123.11, 204, 244/208, 209
See application file for complete search history.

(56) References Cited

U.S. PATENT DOCUMENTS

| | | | |
|---|---|---|---|
| 1,333,620 A | 3/1920 | Kemp | |
| 2,169,325 A | 8/1939 | Novak | |
| 2,368,702 A * | 2/1945 | Bourne | 244/130 |
| 2,447,100 A | 8/1948 | Stalker | |
| 2,461,745 A * | 2/1949 | Lang | 244/130 |
| 2,554,187 A * | 5/1951 | Griffith | 244/208 |
| 2,569,983 A * | 10/1951 | Favre | 244/206 |
| 2,737,411 A | 3/1956 | Potter | |
| 2,841,344 A * | 7/1958 | Stroukoff | 244/208 |
| 3,374,971 A * | 3/1968 | Heskestad | 244/130 |
| 3,406,929 A | 10/1968 | Young | |
| 3,412,962 A * | 11/1968 | Killian | 244/130 |
| 3,432,125 A | 3/1969 | Schroeder, Jr. | |
| 3,999,797 A | 12/1976 | Kirsch et al. | |
| 4,471,925 A * | 9/1984 | Kunz | 244/130 |
| 4,664,345 A * | 5/1987 | Lurz | 244/209 |
| 5,167,387 A | 12/1992 | Hartwich | |
| 5,358,200 A | 10/1994 | Onda | |
| 5,794,893 A * | 8/1998 | Diller et al. | 246/213 |

(Continued)

FOREIGN PATENT DOCUMENTS

FR 737957 12/1932
FR 958682 5/1950

(Continued)

OTHER PUBLICATIONS

Waitz, Ian, "Unified Lecture #2: The Bregaet Range Equation", http://web.mit.edu/16.unified/www/FALL/BreguetNotes.pdf.

(Continued)

*Primary Examiner* — Tien Dinh

(74) *Attorney, Agent, or Firm* — Maier & Maier, PLLC

(57) ABSTRACT

An apparatus, method and system for combining aerodynamic design with engine power to increase synergy between the two and increase climb performance, engine-out performance, and fuel efficiency for a variety of aircraft or the like.

12 Claims, 12 Drawing Sheets

(56) References Cited

U.S. PATENT DOCUMENTS

| | | | | |
|---|---|---|---|---|
| 6,145,791 | A | * | 11/2000 | Diller et al. ............... 244/215 |
| 6,227,498 | B1 | * | 5/2001 | Arata ............... 244/219 |
| 6,520,450 | B1 | | 2/2003 | Seyfang |
| 6,536,350 | B2 | | 3/2003 | Cartland et al. |

FOREIGN PATENT DOCUMENTS

| | | |
|---|---|---|
| FR | 1181456 | 6/1959 |
| GB | 578763 | 7/1946 |

OTHER PUBLICATIONS

Goldschmied, F., "Wind Tunnel Test of the Modified Goldschmied Model with Propulsion and Empennage: Analysis of Test Results", 1986, DTNSRDC/ASED-CR-02-86.

Saeed, F. et al., "Multipoint Inverse Airfoil Design Method for Slot-Suction Airfoils", Journal of Aircraft, vol. 33, No. 4, Jul.-Aug. 1996.

Drela, M., "Power Balance in Aerodynamic Flows", AIAA Journal, vol. 47, No. 7, Jul. 2009.

P.N. Peraudo et al. "Computational Study of the Embedded Engine Static Pressure Thrust Propulsion System". American Institute of Aeronautics and Astronautics.

http://www.avinc.com/uas/adc/broomstick/.

http://www.archive.org/download/nasa_techdoc_19780078524/19780078524.pdf.

1 page from Supplementary European Search Report corresponding to European Patent Application No. 05 85 7227.

Joshua Roepke, An Experimental Investigation of a Goldschmied Propulsor, In Partial Fulfillment of the Requirements for the Degree Master of Science in Aerospace Engineering, A Thesis presented to the Faculty of California Polytechnic State University San Luis Obispo, Aug. 2012, 205 pages.

\* cited by examiner

US 9,764,823 B2

APPARATUS, SYSTEM AND METHOD FOR DRAG REDUCTION

CROSS-REFERENCE TO RELATED APPLICATIONS

This application is a divisional application to U.S. patent application Ser. No. 11/314,525, filed on Dec. 22, 2005, which claims priority under 35 U.S.C. §119(e) to U.S. provisional patent Application No. 60/638,351, filed Dec. 23, 2004, and to U.S. provisional patent Application No. 60/686,932, filed Jun. 3, 2005, the entire contents of which are incorporated by reference herein.

BACKGROUND OF THE INVENTION

The general concept of pressure thrust is known in the fluid dynamics design art, to include airfoils, aircraft and submarines. The phenomenon uses energy of the air rushing past an airplane's wing, tail surfaces or fuselage, to push that wing, tail surface or fuselage forwards. The energy required to force the free stream of airflow against the aircraft is less than the energy recovered from the airflow allowing the system to generate a decrease in total energy required.

In the 1940s and 1950s the Griffith Aerofoil was developed. Researchers focused on very thick aerofoils, for use on span-loaded flying-wing transport and they proved a meaningful decrease in total power required for those designs. Fabio Goldschmied with help from Denis Bushnell at NASA uncovered and verified the pressure thrust phenomenon. It is explained in Goldschmied, F. R., "Airfoil Static-Pressure Thrust: Flight-Test Verification," AIAA Paper 90-3286, September 1990 the contents of which are hereby incorporated by reference in their entirety. Additional documentation can be found, for example, in Richards, E. J. and Burge, C. H. "An Airfoil Designed to Give Laminar Flow Over the Whole Surface with Boundary-Layer Suction," A.R.C. RBM 2263, June 1943; Richards, E. J., Walker W. S. and Greening J. R., "Tests of a Griffith aerofoil in the 13 ft.×9 ft. wind tunnel part 1, part 2, part 3, part 4, lift, drag, pitching moments and velocity distribution," ARC/R&M-2148 ARC-7464 ARC-7561 ARC-8054 ARC-8055, 1944 and Richards, E. J., Walker, W. S. and Taylor, C. R., "Wind-Tunnel Tests on a 30% Suction Wing" A.R.C. RBM 2149, July 1945, "Incompressible Aerodynamics" B. Thwaites, Dover, 1960, http://web.mit.edu/16.unified/www/FALL/BreguetNotes.pdf, as viewed on Dec. 21, 2005, and http://web.mit.edu/16.unified/www/SPRING/propulsion/UnifiedPropulsion4/UnifiedPropulsion4.htm, as viewed Dec. 21, 2005, and "Personal Aircraft Drag Reduction," by Bruce H. Carmichael (Capistrano Beach, Calif.: Carmichael, 1995), the contents of which are hereby incorporated by reference in their entirety.

Likewise U.S. Pat. No. 5,358,200 entitled "AIRSHIP" and U.S. Pat. No. 5,099,685 entitled "BOUNDARY LAYER CONTROL DIFFUSER FOR A WIND TUNNEL OR THE LIKE" describe related art.

Further, FIG. 1 illustrates an alternative configuration showing a profile and theoretical velocity distribution of an airfoil. Likewise, FIG. 2 illustrates background art showing theoretical and experimental velocity distribution on a symmetrical airfoil with suction.

BRIEF DESCRIPTION OF THE DRAWINGS

Advantages of embodiments the present invention will be apparent from the following detailed description of the preferred embodiments thereof, which description should be considered in conjunction with the accompanying drawings in which.

DETAILED DESCRIPTION

Figure 1:
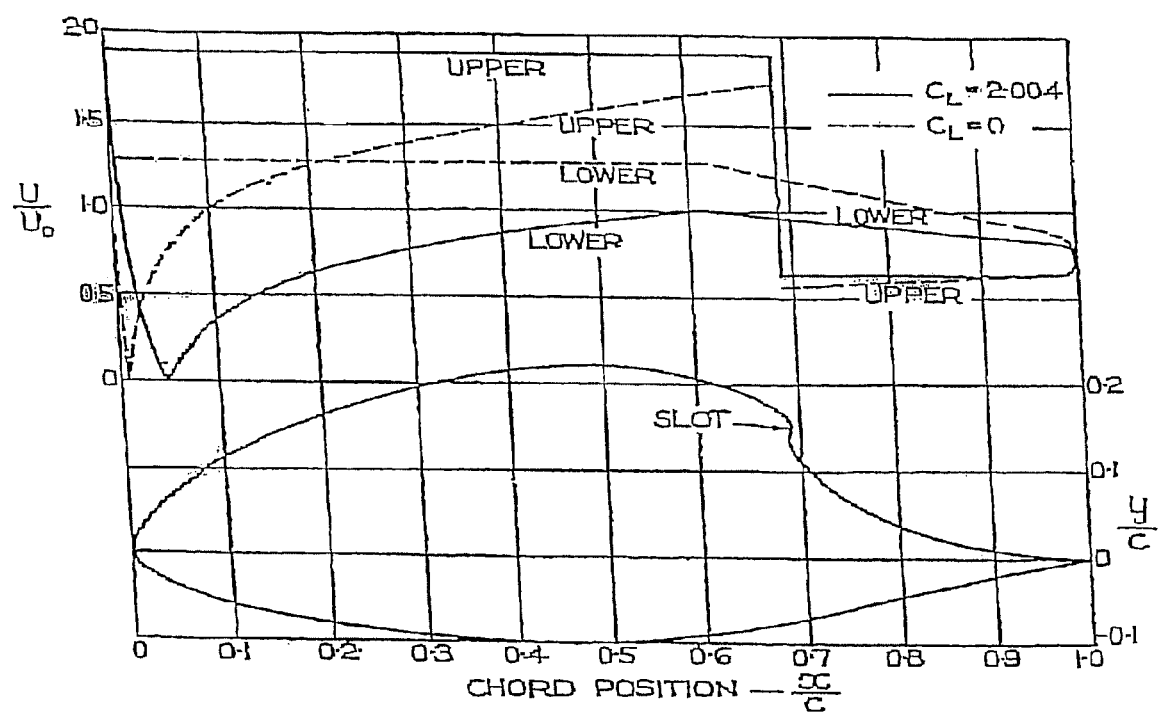
FIG. 1 illustrates background art showing a profile and theoretical velocity distribution of an airfoil.
Figure 2:
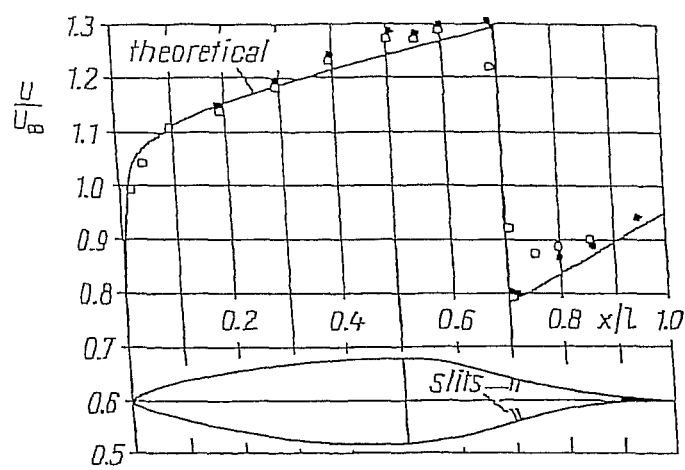
FIG. 2 illustrates more background art showing theoretical and experimental velocity distribution on a symmetrical aerofoil with suction.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The phenomenon of pressure thrust uses energy of the air rushing past an airplane's wing, tail surfaces or fuselage, to push that wing, tail surface or fuselage forwards. To generate this effect a suction pump may be used to suck away a portion of the airfoil's boundary layer, which causes the free stream airflow to blow against the concave aerospike shape. The free stream pressure blows against this aerospike shape and one result is enough thrust to eliminate pressure drag and offset a staggering amount of skin-friction drag and yield a low total power requirement. In one embodiment, an aerospike may be used to recover this energy, but alternative shapes, including, but not limited to, current airfoils and tailcones could also work.

Generally referring to FIGS. 3, 4, 5, 6, 10a-c and 11, the suction pump could be powered in any conventional manner. In one embodiment a windmill could be used much like the setup found on crop-dusters. Alternatively, existing engines could be coupled to suction pumps via mechanical, electric, hydraulic or any other conventional means. In yet another embodiment, dedicated engines could be installed directly to generate the required suction.

One embodiment of the invention may relate to a method and system for combining two drag reduction mechanisms to dramatically increase climb performance, engine-out performance, and fuel efficiency for a variety of aircraft or the like. More specifically, the invention could relate to a system and method that combine the benefits of both a phenomenon called 'Laminar Flow', and a phenomenon called 'Pressure Thrust'.

The phenomenon of Pressure Thrust utilizes dynamic pressure and airspeed to force a system forward (e.g. airfoil, fuselage, ship, or other body through an air or fluid medium). In at least one exemplary embodiment, a suction pump or the like may be used to remove a portion of the boundary layer fluid (B.L) around the airfoil (e.g. ½ of the B.L. air). This forces the free-stream airflow or fluid flow against the trailing edge of the airfoil or other system. In the embodiments discussed herein air may be used as a non-limiting example of a fluid. Further, exemplary embodiments of the invention include a trailing edge formed into an 'aerospike' shape which results in enough thrust to eliminate pressure drag and offset a large amount of drag cause by skin friction.

Figure 3:
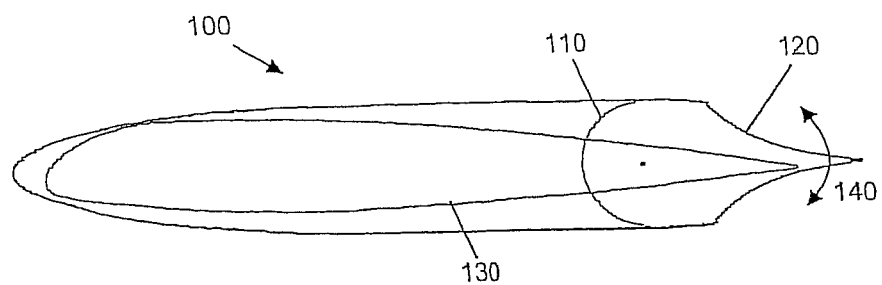
FIG. 3 illustrates a side view of an exemplary embodiment of a glove wrapping an standard aerofoil in accordance with at least one embodiment of the invention.

FIG. 3 illustrates a flow modifying system in accordance with at least one exemplary embodiment. A covering system (e.g. glove 100) may be configured to cover a fluid traveling body (e.g. an airfoil 130). For ease of discussion airfoils in airflows will be discussed although the invention can be used in any fluid and system than travels therethrough. The airfoil 130 is covered by a glove 100, which has a trailing edge 120, and a hinged control surface 110, which can optionally rotate 140. The trailing edge 120 can be designed to stimulate flow impingement upon the trailing edge increasing the pressure at the trailing edge, and thus increasing the pressure thrust.

Figure 4:
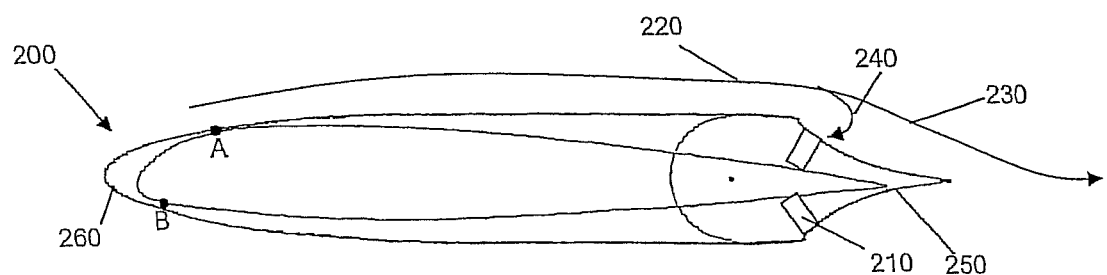
FIG. 4 illustrates another side view of another exemplary embodiment a glove wrapped around a standard airfoil in accordance with at least one embodiment of the invention.

FIG. 4 illustrates at least another exemplary embodiment where a flow driving mechanism 210 (e.g. suction mechanism, flow injector, turbulence producer) drives a fluid portion 240 of the free stream flow 220, with a remainder 230, toward the trailing edge 250. The fluid portion 230 impinges the trailing edge 250, imparting momentum and/or increasing localized pressure, increasing the pressure thrust.

In further embodiments, the flow modifying mechanism 200 need not cover an entire airfoil. For example, the leading edge portion 260 can be removed and the flow modifying mechanism 200 can be attached at various positions depending upon flight conditions (e.g. position A and B). Attachments can be via fasteners (e.g. bolts, latches, pins, adhesive, welding or any other fastening devices and methods known to one skilled in the art.) Likewise, the embodiment covering the entire airfoil, can, optionally, cover the entire wing or portions of the wing, the fuselage or portions of the fuselage and be fastened by similar devices and methods as described above.

Figure 5:
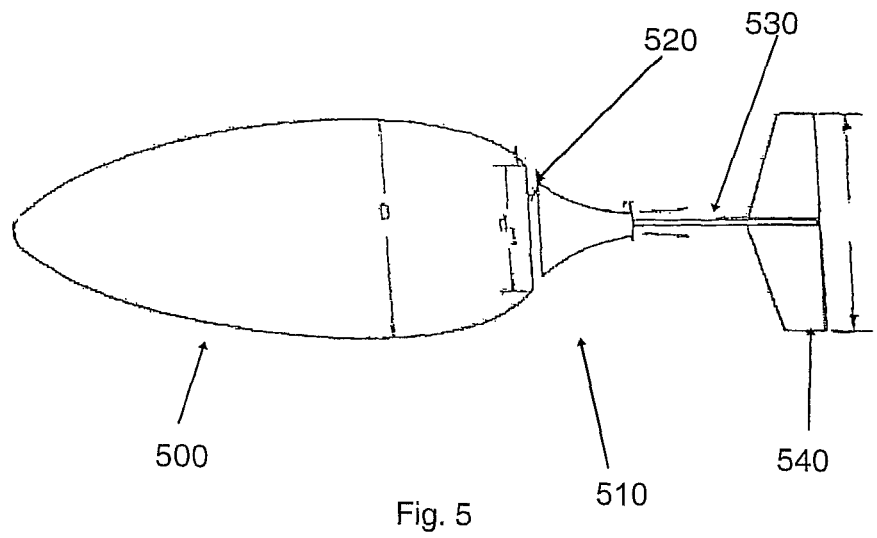
FIG. 5 illustrates more background art showing Goldschmied's body geometry.

FIG. 5 is an example of a self-propelled fuselage generating a high economy of power. This design 500 by Goldschmied was round, but otherwise similar to the previously mentioned Griffith Aerofoil, including the concave shape 510 at the trailing edge, sometimes referred to as a ringloeb cusp. This concave shape resembles the external nozzle of an aerospike rocket engine and may perform a similar function. The design further includes tail boom 530 and empennage 540. Additionally, this fuselage design by Goldschmied has a flow trip in the first 10% of its length, helping to eliminate laminar flow beyond that point. In this example, tests showed that suction ducted through slot 520, combined with airflow moving, in this case, from left to right, could eliminate most of the drag force, or momentum deficit. However, the most efficient amount of suction left 10% of the unmodified momentum deficit behind. This shows the beginning of an integration of power into an airframe opposed to other current designs.

Suction slot 520 on this design evacuates about half of the boundary layer air, sending high speed, free stream air against the ringloeb cusp 510. This recovers energy from that flow and turns it into forward thrust. In addition, a suction pump in suction slot 520 can restore evacuated, slow-moving boundary layer air to near-free-stream velocity.

Figure 6:
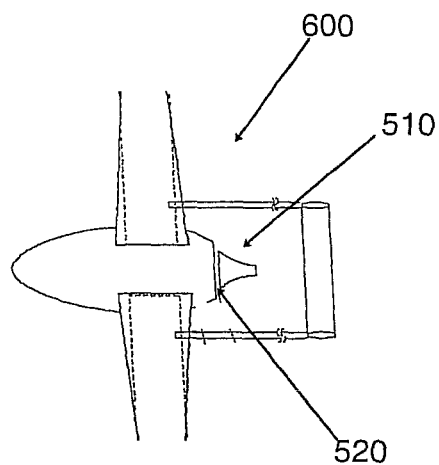
FIG. 6 illustrates more background art showing an image of Goldschmied's 4-place aircraft.
Figure 7:
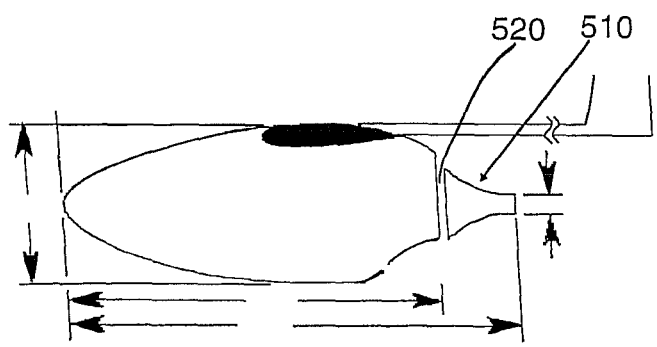
FIG. 7 illustrates more background art showing another image of Goldschmied's 4-place aircraft.

FIGS. 6 and 7 show two images of a Goldschmied design four-place aircraft 600. From the above data, it was estimated that a four-place, 2900 pound, General Aviation aircraft using this fuselage design shown in FIGS. 5-7 (including the flow trip) would cruise at 200 MPH on 120 horsepower. This would have an advantage over a 3100 pound Beech Bonanza V35, which cruises at 200 MPH on about 200 horsepower or a 3000 pound Cessna 182 that cruises at 185 MPH on 210 horsepower.

Figure 8:
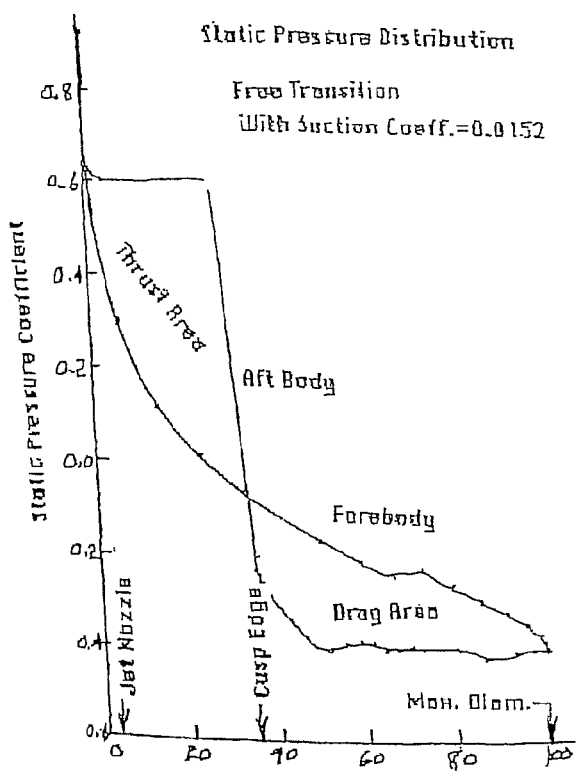
FIG. 8 illustrates more background art showing Goldschmied's test of static pressure distribution.
Figure 9:
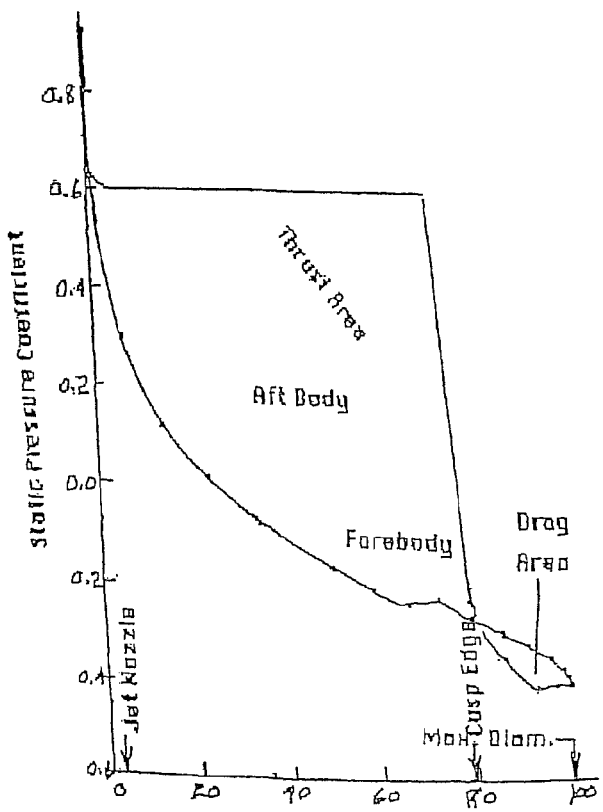
FIG. 9 illustrates more background art showing an estimation of benefits that may come from optimizing the design for maximum benefit from pressure thrust.

FIG. 8 is a graphical representation of Goldschmied's data on pressure thrust, and FIG. 9 is a graphical representation of an estimation of benefits that may come from optimizing the design for maximum benefit from pressure thrust (maximum fuselage cross section area devoted to the optimized concave shape).

As further shown in FIGS. 8 and 9, despite turbulent gas flow, Goldschmied's self-propelled fuselage showed an increase in power efficiency of 40% by using an external nozzle shape comprising 16-25% of the fuselage's maximum cross section. Therefore, it has now been determined that if the benefit was coming from free-stream flow exerting force against the concave shape, it could be optimized for different flow conditions and the surface area of the shape could be increased to the maximum available amount, thus significantly increasing the benefits generated. Increased surface area generating increased pressure thrust can be confirmed by FIG. 17b, showing a computational fluid dynamics analysis of a blimp shape, moving from left to right, that is modified with suction slot 520 and concave aerospike shape 510.

Figure 10A:
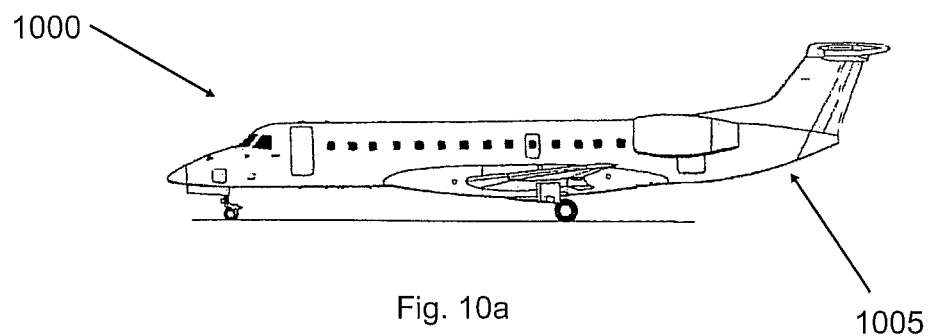
FIG. 10a illustrates a side view of an exemplary embodiment of a Embraer 135 aircraft.
Figure 10B:
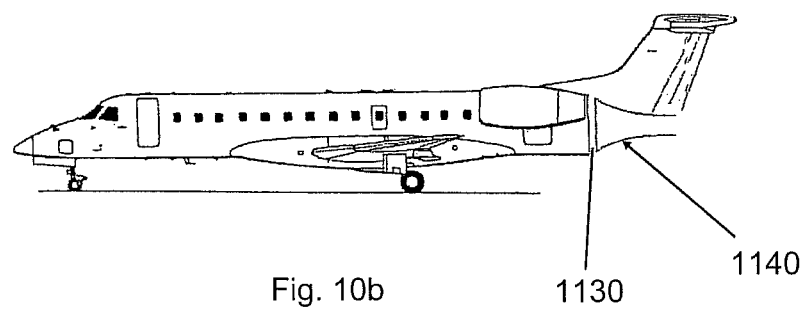
FIG. 10b illustrates a side view of an exemplary embodiment of a Embraer 135 aircraft using one embodiment of the invention.
Figure 10C:
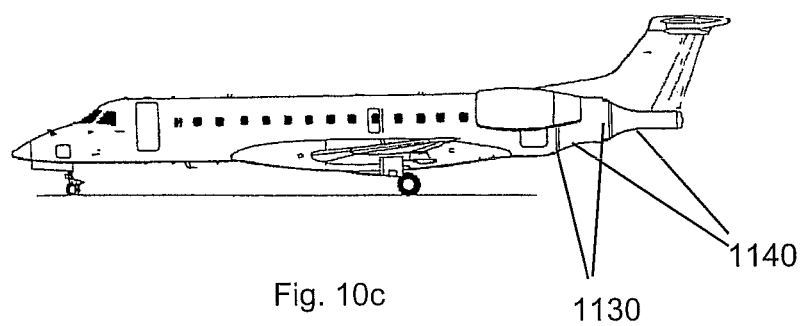
FIG. 10c illustrates a side view of an exemplary embodiment of a Embraer 135 aircraft using one embodiment of the invention.
Figure 11:
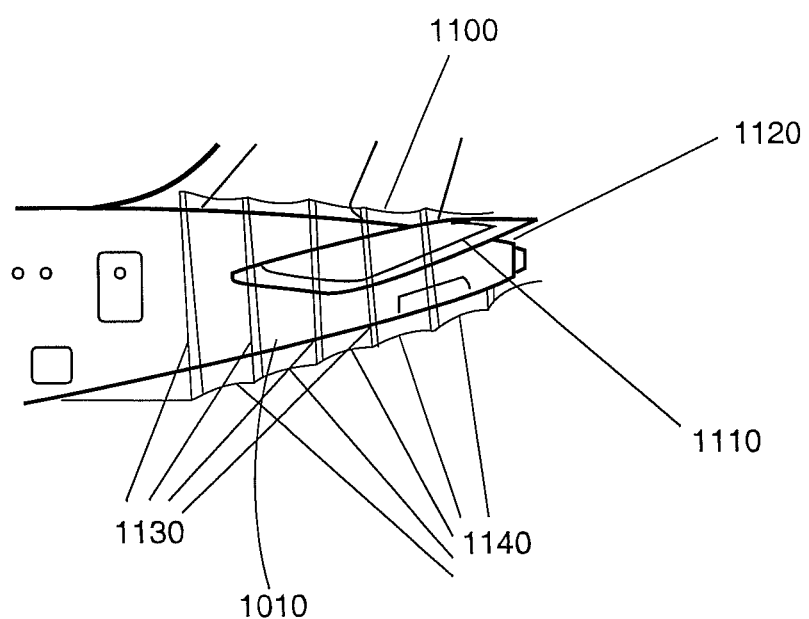
FIG. 11 illustrates a power efficient sleeve with a series of concave steps showing a "staircase" approach to enable maximum cross-sectional area devoted to pressure thrust.

FIGS. 10a-c and 11 show an example of an aircraft 1000 with an optimized airframe and power plant synergy. A standard tail cone 1005 on a traditional aircraft is formed in the shape of a ramp that limits pressure thrust, as shown in FIG. 10a. FIGS. 10b and 10c show exemplary embodiments of the invention where step or series of steps 1140 may be combined with suction slot or slots 1130. A further embodiment is shown in the close-up view in FIG. 11. In FIG. 11, a streamlined, power efficient tail cone 1010 utilizing a series of steps may be implemented to take advantage of the benefits of pressure thrust. The tailcone in FIG. 11 shows glove 1100 over tailcone 1010 and terminating at tail end 1120. Glove 1100 further utilizes suction slots 1130 and optimized concave shapes or steps 1140. FIG. 10b shows a similar installation where the standard tailcone is replaced with a pressure thrust tailcone exploiting only one suction slot 1130 and one concave shape or step 1140.

The step or staircase design used in steps 1140 does not only need to aerodynamic, per se. Current aircraft have tailcones that are optimized to have the best aerodynamics. Instead, the staircase design is intended to be power efficient, not simply aerodynamic. Thus the smooth surface of traditional tail cones, such as tail cone 1005 in FIG. 10a, may be covered with suction slots 1130 and steps 1140 to make a power efficient tail cone.

Figure 12:
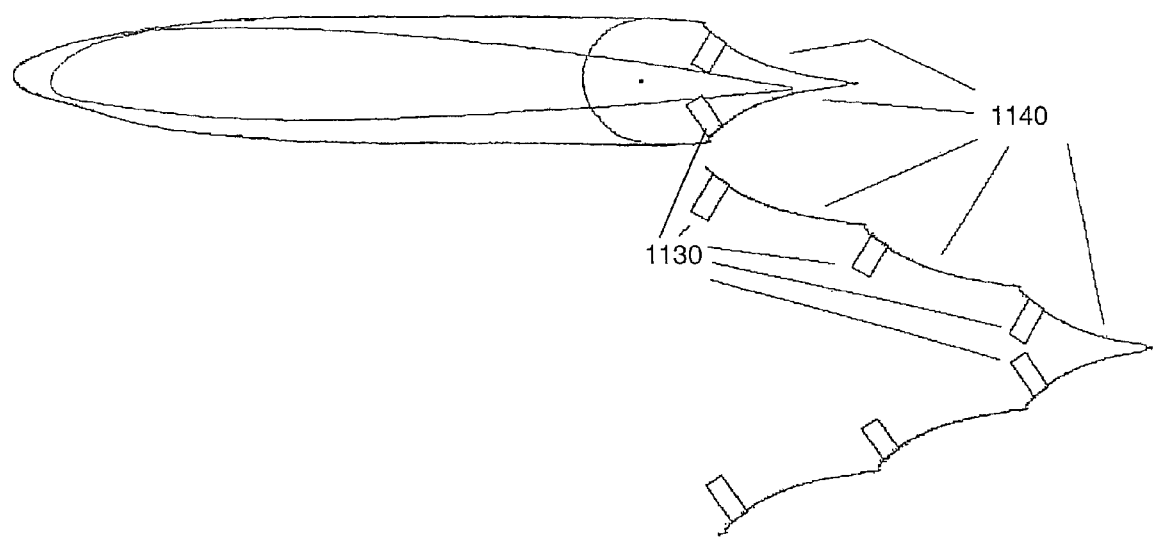
FIG. 12 illustrates another side view of another exemplary embodiment showing a glove wrapped around a standard airfoil and a glove with several optimized concave shapes that may be wrapped around a body in accordance with at least one embodiment of the invention.

The power efficient staircase design of FIG. 11 is shown at a zoomed view in FIG. 12, applied to an airfoil shape instead of an aircraft tailcone. Suction slots 1130 and steps 1140, when incorporated into trailing edge design, can use their concave shapes to add utility to modern aircraft. As described above, the incorporation of these features can provide a variety of advantages. For example, the payload capacity of an airliner equipped with embodiments of the invention may be greatly increased. Additionally, any weight increase to the aircraft that may be caused as a result of the addition of an embodiment of the invention to the aircraft can be offset by the fuel savings caused by the invention yielding an increase in payload.

Additional embodiments of the subject invention may include varied aerospike shapes for differing flight conditions like Reynolds numbers.

Another embodiment of the invention provides for an airfoil with a composite glove or sleeve having sufficient smoothness therearound. The aerodynamic shape for the first approximately 75% of chord being of a "natural laminar flow" design type. The remainder of the airfoil may have turbulent flow caused as air flows over the aileron, flap, or control surface joint. Airflow behind the control surface can be held against the aerospike under the influence of a vacuum or suction pump or the like. In another exemplary embodiment, the design may ensure safety if a suction pump fails.

In yet another embodiment of the invention, the trailing edge of the aerospike shape may have the same slope as those used in wind tunnel and flight tests to provide a up to a 40 percent airfoil savings at 10M Reynolds number. The shape of embodiments may be varied for other Reynolds numbers.

Operation during pump-off operation can additionally be undiminished. The design of the invention may provide for higher drag when the suction pump is off due to separated flow. Separated flow, however, may not be a detriment to flight safety. For example, when ailerons on the A-10 Thunderbolt II are split to act as a speed brake, full control authority can actually increase.

Figure 13:
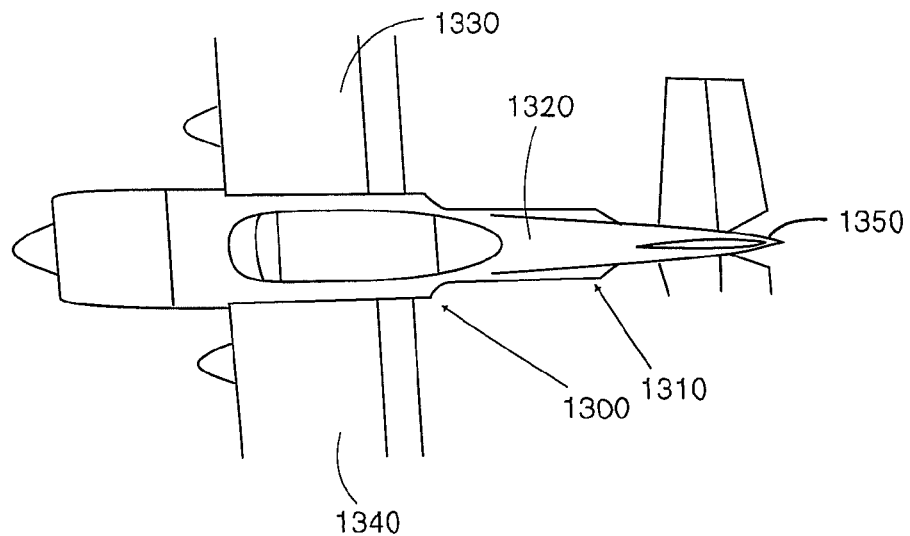
FIG. 13 illustrates a top down view of another exemplary embodiment showing concaved shaped steps on the wings and empennage of a small aircraft.
Figure 14:
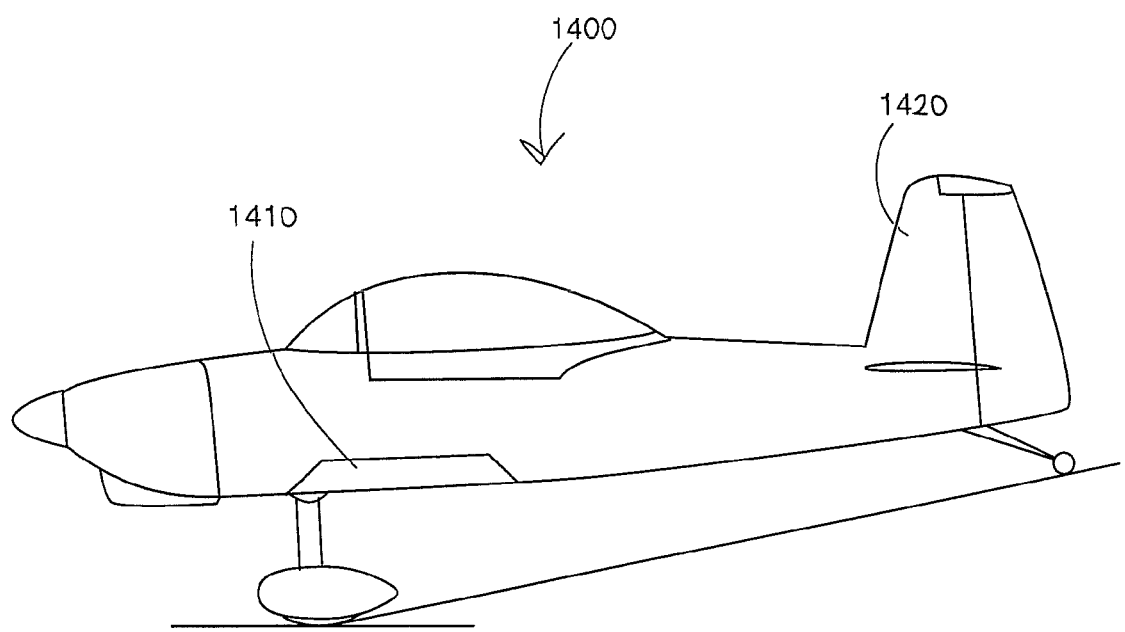
FIG. 14 illustrates a side view of another exemplary embodiment showing the modifications of FIG. 13 further incorporated into the wings and empennage of a small aircraft.

FIGS. 13 and 14 show two exemplary embodiments of the present invention. One such embodiment incorporating pressure thrust pressure could be utilized in aircraft focused on climb performance. In such designs as the RV-series, Nemesis NXT and/or Lancair IV, for example, the existing aircraft could be optimized for pressure thrust with minimum difficulty. For example, in FIG. 13, concave-shaped steps 1300 and 1310 may allow for 100% of fuselage 1320 width to be devoted to pressure thrust. In such an example, modifying wings 1330 and 1340, empennage 1350 and fuselage 1320 can yield a phenomenal total power savings.

FIG. 14 shows a further embodiment of the invention. In this embodiment, the fuselage modifications shown in FIG. 13 could further be implemented on wings 1410 and empennage 1420 of airplane 1400. Wings 1410 may not need to be any thicker than a standard wing, but the thickness of wings 1410 may be carried further aft. This design can allow the maximum allowable thickness to be devoted to pressure thrust.

Figure 15:
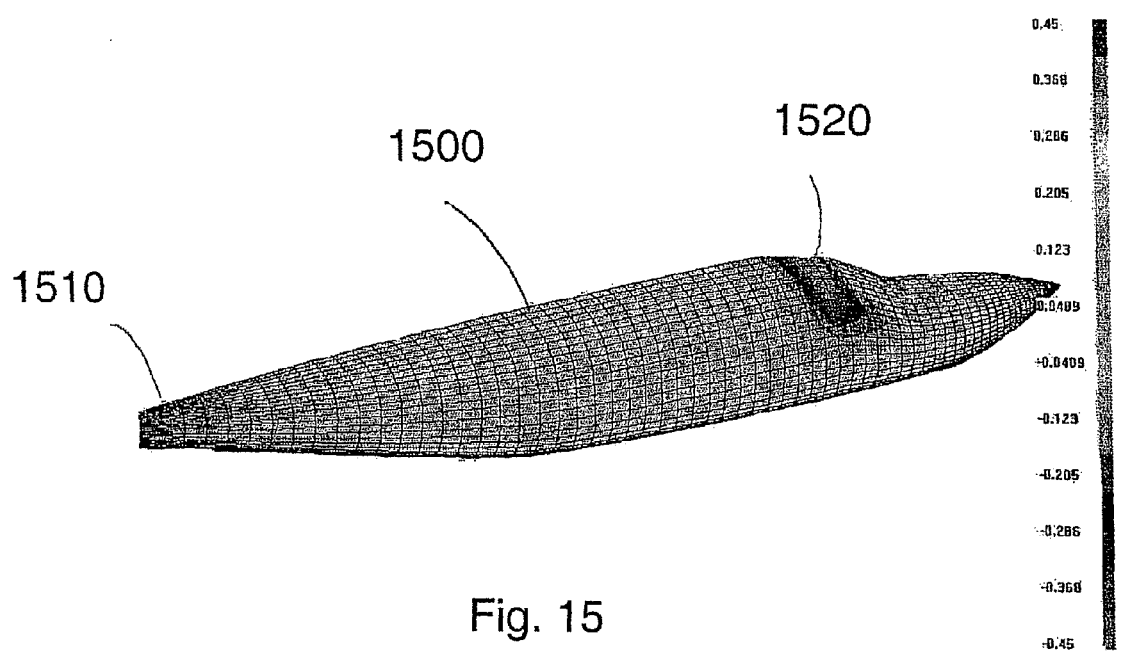
FIG. 15 illustrates an unmodified generic turboprop fuselage.
Figure 16:
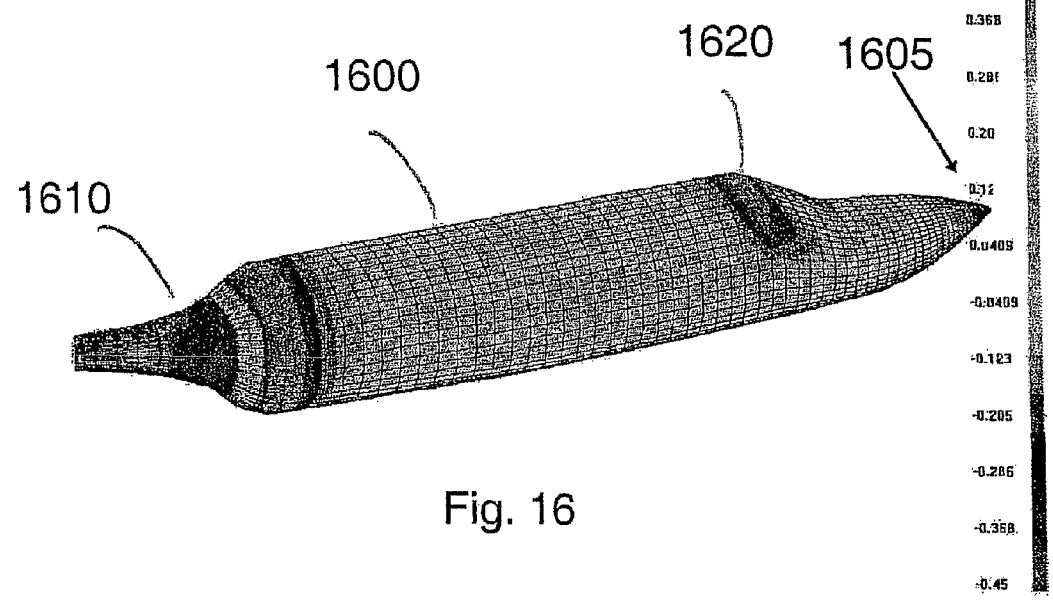
FIG. 16 illustrates a generic turboprop fuselage modified with an exemplary embodiment of the invention.

FIGS. 15 and 16 illustrate exemplary computational fluid dynamics analyses of pressure thrust on an unmodified generic turboprop fuselage and a modified generic turboprop fuselage. The unmodified and standard design fuselage 1500 in FIG. 15 has a coefficient of drag (Cd) of 3.68. This is an expected result as fore portion 1520 of the fuselage leads to the traditionally convex-curve designed end portion 1510. The modified version, incorporating the previously described steps and suction device, of the fuselage shown in FIG. 16 can have a calculated Cd of −15.9. This figure appears to be negative due to the pressure thrust acting on the fuselage. Actual drag will not be negative because skin friction drag will remain; however, the drag on the modified fuselage can be deeply discounted or even overcome entirely due to the amount of pressure thrust.

A relatively small area of high pressure generated at very fore portion, or forward tip, 1605 of fuselage 1600 may be more than balanced by beneficial pressure, or pressure thrust, at aft portion 1610.

The total drag may be seen as negative because the effect of pressure is included into drag. Once the effect of pressure is removed from the drag calculations and included, along with suction-related fuel flow into Thrust Specific Fuel Consumption (TSFC), it can be shown that the modified "open thermodynamic" version of the class range equation demonstrates a way to attain greater aircraft performance, specifically by exploiting pressure thrust. For example, the greater aircraft performance may be shown using the following equation:

$$R = \frac{v}{gTSFC}\left(\frac{L}{D}\right)\ln\left(\frac{W_{initial}}{W_{final}}\right)$$

where "R" is the distance flown, "v" is the velocity, "TSFC" is the thrust specific fuel consumption, "L/D" is the lift-to-drag ratio, "$W_{initial}$" is the initial gross aircraft weight at the start of a cruise, "$W_{final}$" is the gross weight at the end of a cruise and "g" is the acceleration of gravity (9.81 m/s$^2$).

Thus, in the above equation, to correct for the pressure thrust, the pressure drag coefficient ($Cd_p$) can be removed from the drag calculation and pressure thrust, which can be shown as negative pressure drag, along with suction-required fuel consumption may be added to the TSFC calculation. TSFC is the amount of fuel, in pounds, required to produce one pound of thrust for one hour.

Thus a modified range equation can show how suction-related fuel consumption (engine power) and the additional thrust generated by negative (aerodynamic) pressure drag, combine into an integrated "open thermodynamic" range equation. The improvement to aircraft performance can be a result of the synergy of aerodynamics and thermodynamics.

Figure 17A:
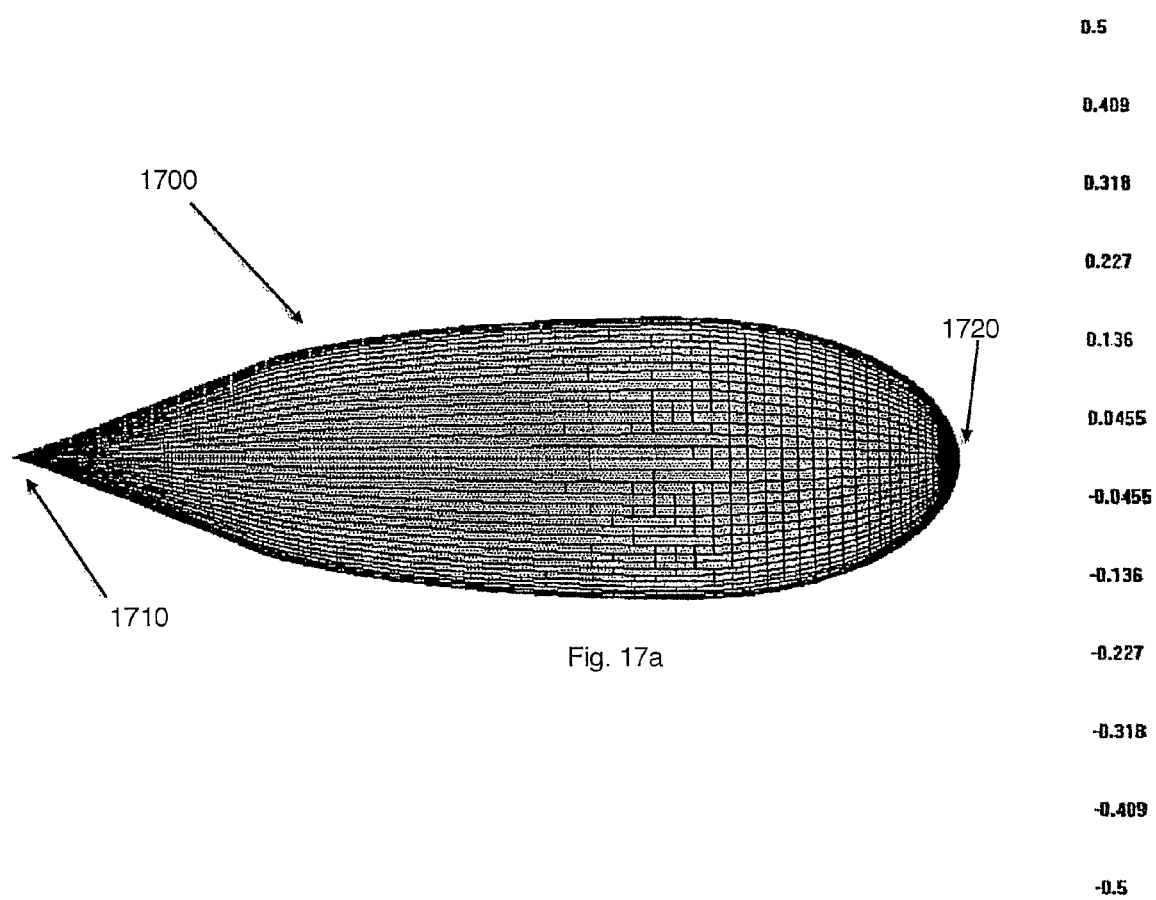
FIG. 17a illustrates an exemplary computational fluid dynamics analysis of pressure thrust on an unmodified blimp shape.
Figure 17B:
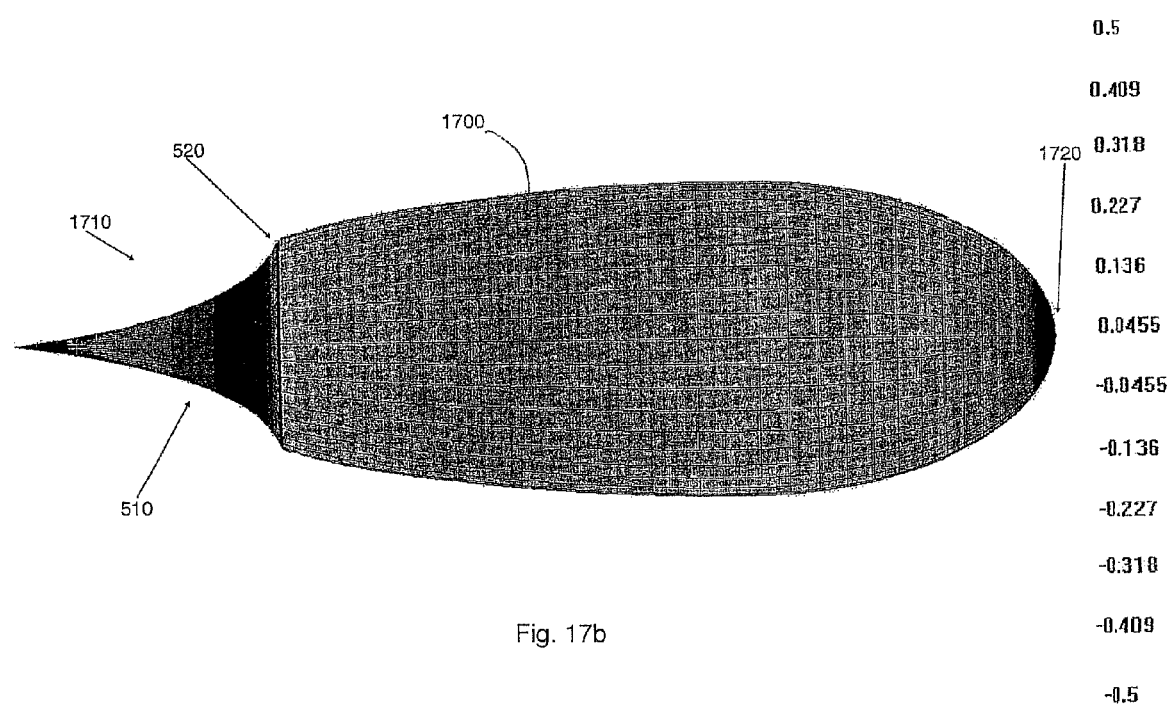
FIG. 17b illustrates an exemplary computational fluid dynamics analysis of pressure thrust on a modified blimp shape.

FIGS. 17a-b illustrate more exemplary computational fluid dynamics analyses of pressure thrust on an unmodified blimp shape, FIG. 17a, and the same blimp shape modified for pressure thrust in FIG. 17b. In each of these figures, the highest positive pressure areas are denoted by the darkest layers of grayscale. A standard blimp is shown in FIG. 17a. As shown in this figure, viewed as moving from left to right, blimp 1700 has convex fore end 1720. The darkened portion of fore end 1720 denotes an area of high pressure. Aft end 1710 does not have an area where any commensurate amount of pressure exists, such as that at fore end 1720.

FIG. 17b shows a blimp modified according to another exemplary embodiment. In this figure, blimp 1700 should again be viewed as moving from left to right. Thus, in FIG. 17b, it can be shown that forward, convex end 1720 creates an area of high pressure. With suction applied at slot 520, the force of the pressure at aft end 1710 may exceed that at forward end 1720. Thus the location of the pressure thrust exerted as a result of incorporating, for example, concave steps 1140 from FIG. 11, may be seen on a larger scale.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A flow modifying system, comprising:
   a cover for covering an aircraft body over which fluid flows;
   a shape on the cover that stimulates flow impingement on a trailing edge of the cover, wherein the trailing edge is substantially concave;
   a flow driving mechanism disposed on the trailing edge; and
   a control surface on the cover.

2. The flow modifying system of claim 1, wherein the flow impingement on the trailing edge increases pressure at the trailing edge.

3. The flow modifying system of claim 2, wherein the increase of pressure at the trailing edge increases pressure thrust.

4. The flow modifying system of claim 1, wherein the control surface is rotatable.

5. The flow modifying system of claim 1, wherein the body over which fluid flows is an airfoil.

6. The flow modifying system of claim 1, wherein cover covers a portion of the body over which fluid flows.

7. The flow modifying system of claim 1, wherein the flow driving mechanism increases pressure on the trailing edge.

8. The flow modifying system of claim 1, wherein the flow driving mechanism removes a portion of the boundary layer air flowing over the body.

9. The flow modifying system of claim 1, wherein the flow driving mechanism is a suction mechanism.

10. The flow modifying system of claim 1, wherein the flow driving mechanism is a turbulence producer.

11. The flow modifying system of claim 1, wherein the cover only covers a portion of the body over which fluid flows and can be attached in different positions.

12. The flow modifying system of claim 1, wherein the cover is attached to the body over which fluid flows by fasteners.

* * * * *